(12) United States Patent
Krijn et al.

(10) Patent No.: US 10,694,680 B2
(45) Date of Patent: Jun. 30, 2020

(54) METHOD OF CONTROLLING AN ARTIFICIAL LIGHT PLANT GROWING SYSTEM

(71) Applicant: SIGNIFY HOLDING B.V., Eindhoven (NL)

(72) Inventors: Marcellinus Petrus Carolus Michael Krijn, Eindhoven (NL); Gabriel-Eugen Onac, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 498 days.

(21) Appl. No.: 15/318,171

(22) PCT Filed: Jun. 8, 2015

(86) PCT No.: PCT/EP2015/062662
§ 371 (c)(1),
(2) Date: Dec. 12, 2016

(87) PCT Pub. No.: WO2015/189123
PCT Pub. Date: Dec. 17, 2015

(65) Prior Publication Data
US 2017/0135288 A1    May 18, 2017

(30) Foreign Application Priority Data
Jun. 12, 2014   (EP) ..................................... 14172157

(51) Int. Cl.
*A01G 7/04*    (2006.01)
(52) U.S. Cl.
CPC .................................... *A01G 7/045* (2013.01)

(58) Field of Classification Search
CPC ....................................................... A01G 7/045
See application file for complete search history.

(56) References Cited

U.S. PATENT DOCUMENTS

| 5,269,093 A | 12/1993 | Horaguchi et al. |
| 5,818,734 A | 10/1998 | Albright |
| (Continued) | | |

FOREIGN PATENT DOCUMENTS

| JP | H05227660 A | 9/1993 |
| JP | 2012182998 A | 9/2012 |
| (Continued) | | |

*Primary Examiner* — Jessica B Wong
(74) *Attorney, Agent, or Firm* — Meenakshy Chakravorty

(57) ABSTRACT

The present application relates to a method of controlling an artificial light plant growing system (1). The method includes receiving information indicative of a production demand for a plant type to be grown in the artificial light plant growing system (1) and information indicative of an energy supply for a light source (9) of the artificial light plant growing system (1), and controlling operation of the light source (9) of a plant growing environment of the artificial light plant growing system (1) in dependence on the received information so that the production rate of a plant (8) of said plant type grown in the system (1) versus the production demand and energy supply is optimised. The present application also relates to a computer program comprising instructions which, when executed by at least one processor, cause the method of to be performed, a controller (5) for controlling an artificial light plant growing system (1), and an artificial light plant growing system (1).

13 Claims, 4 Drawing Sheets

(56) References Cited

U.S. PATENT DOCUMENTS

| | | | | |
|---|---|---|---|---|
| 8,650,798 | B1* | 2/2014 | Armstrong | C12N 1/12 47/1.4 |
| 2005/0252078 | A1 | 11/2005 | Albright et al. | |
| 2011/0153053 | A1 | 6/2011 | Kim et al. | |
| 2012/0054061 | A1* | 3/2012 | Fok | A01G 31/00 705/26.5 |

FOREIGN PATENT DOCUMENTS

| | | |
|---|---|---|
| JP | 2013005766 A | 1/2013 |
| JP | 2013172698 A | 9/2013 |
| RU | 2326525 C2 | 6/2008 |
| RU | 2397636 C1 | 8/2010 |
| RU | 2448455 C2 | 4/2012 |
| WO | 2013089825 A1 | 6/2013 |

* cited by examiner

METHOD OF CONTROLLING AN ARTIFICIAL LIGHT PLANT GROWING SYSTEM

CROSS-REFERENCE TO PRIOR APPLICATIONS

This application is the U.S. National Phase application under 35 U.S.C. § 371 of International Application No. PCT/EP2015/062662, filed on Jun. 8, 2015, which claims the benefit of European Patent Application No. 14172157.1, filed on Jun. 12, 2014. These applications are hereby incorporated by reference herein.

FIELD OF THE INVENTION

The present invention relates to a method of controlling an artificial light plant growing system. The present invention also relates to a computer program comprising instructions which, when executed by at least one processor, cause the method to be performed, a controller for controlling an artificial light plant growing system, and an artificial light plant growing system.

BACKGROUND OF THE INVENTION

Plant growing systems are known that comprise a light source for supplying artificial light to a plant being grown in the plant growing system. The light source facilitates growth of the plant during periods when low levels of natural light are available, for example, due to seasonal variations in natural light levels.

WO 2013/089825 discloses a device having a light source for assisting growth of a plant, wherein the power consumption of the light source is varied according to the electricity rate. The power consumption of the light source is increased when the electricity rate is low to reduce the cost of growing the plant. However, this can result in the growth of the plant being accelerated such that it matures and is ready for harvest at a time when there is already an abundance of that type of plant on the market, in which case the plant is superfluous to requirements and may be wasted.

US 2005/0252078 discloses a method and system for optimising plant production in a cost effective manner. The system comprises a processor that controls resources such as lighting and carbon dioxide. The processor receives a desired plant production rate and determines amounts of each resource to expend consistent with plant production goals and resource costs.

SUMMARY OF THE INVENTION

It is an object of the invention to provide a method of controlling an artificial light plant growing system, a computer program comprising instructions which, when executed by at least one processor, cause the method to be performed, a controller for controlling an artificial light plant growing system, and/or an artificial light plant growing system which substantially alleviates or overcomes the problems mentioned above.

According to the present invention, there is provided a method of controlling an artificial light plant growing system, comprising receiving information indicative of a production demand for a plant type to be grown in the artificial light plant growing system and information indicative of an energy supply for a light source of the artificial light plant growing system, and controlling operation of the light source of a plant growing environment of the artificial light plant growing system in dependence on the received information so that the production rate of a plant of said plant type grown in the system versus the production demand and energy supply is optimised.

With this method it is possible to make the most effective use of the production rate, for example, by reducing the production rate when the demand for the type of plant being grown is low to reduce waste caused by over production of the plant type and reducing the production rate when the demand on energy is high to reduce the peak load on the energy supply. In addition, it is possible to accelerate the production rate when the demand for the type of plant being grown is high and when the demand on energy is low.

The information indicative of the energy supply may be the cost of energy or the energy supply demand, which may be provided in a variety of methods, including an energy supply demand ratio, or information indicative of energy supply demand based on a cost of the available energy supply. Therefore, it is possible to reduce the peak load on the energy supply by using electrical energy to power the light source when information is received that demand for electrical energy from the energy supply is low. The energy supply provides energy to the light source and may be, for example, an electricity distribution network or a battery. In an alternative embodiment, the energy supply is a fuel, for example, propane or methane, which may be used to generate electricity locally to power the light source. In one such embodiment, the cost of the available energy supply is the cost of the fuel.

The method may further comprise referring to one or more plant type specific parameters in dependence on the plant type to be grown, and controlling operation of the light source in dependence on the one or more plant type specific parameters.

Therefore, it is possible to control growth of a plant in the plant growing environment in dependence on the type of plant to be grown. Therefore, the method can help to maximise efficiency by adjusting operation of the light source in dependence on the specific plant type being grown.

The or one of the plant type specific parameters may be a minimum light exposure level to be supplied to a plant of said plant type.

Therefore, it is possible to ensure that an adequate supply of light is provided to sustain the life of the plant in dependence on information indicative of the plant type. Therefore, the method makes it possible to limit growth of the plant to be grown to prevent waste, whilst preventing the plant from dying and so preventing waste of the plant.

The or one of the plant type specific parameters may be a maximum light exposure level to be supplied to a plant of said plant type.

The or one of the plant specific parameters may be a minimum period of operation of the light source at a minimum level. The minimum level may be the light level required for the plants to process assimilates accumulated during photosynthesis or to induce flowering in the plants. In one embodiment, no light is output by the light source when it is operated at the minimum level. The or one of the plant specific parameters may be an intensity level of the light source.

This means that it is possible to schedule a mandatory dark period for plants. This allows the plants to be grown to be provided with a period to process assimilates accumulated during a period in which the light source is operated, or is operated at a higher intensity level. By adjusting the parameters of the mandatory dark period in dependence on the plant type it is possible to maximise the efficiency of plant growth and to more accurately control plant growth in the plant growing environment. Maximising the efficiency of the plant growth reduces the total amount of energy that must be supplied to the light source to grow the plant and therefore reduces the environmental impact and cost of producing the plant. In one embodiment, the plants of the artificial light growing system are isolated from natural light. This allows for the dark period to be completely independent of the time of day.

The method may further comprise controlling operation of the light source to adjust the growth rate of said plant by controlling the light spectrum profile of the light supplied to the plants by the light source.

The method may further comprise controlling the level of $CO_2$ in the plant growing environment of the artificial light plant growing system in dependence on the determined operation of the light source. The method may further comprise controlling the temperature in the plant growing environment of the artificial light plant growing system in dependence on the determined operation of the light source.

This method provides for the light use efficiency of the plant to be maximised. Growth of a plant in response to light exposure has been found to be dependent also on the level of $CO_2$ and the temperature in the plant growing environment. By controlling one or both of the level of $CO_2$ and the temperature in the plant growing environment it is possible to more accurately control the rate of growth of a plant in the plant growing environment in dependence on the plant type.

The method may further comprise detecting an environmental condition of the plant growing environment and controlling operation of the light source in dependence on the detected environmental condition. The environmental condition may be one or more of a CO2 level and a temperature level. The method may further comprise adjusting operation of the light source when a desired environmental condition in the plant growing environment is detected.

With the above it is possible to coordinate operation of the light source with the environmental condition in the plant growing environment. It will be appreciated that the rate of change of some environmental conditions, such as temperature and $CO_2$ levels, is much less than the rate of change of operation of a light source. Therefore, it is possible to operate the light source in dependence on one or more environmental conditions to maximise the efficiency of operation of the plant growing system.

Operation of the light source based on the received information may be enacted a predetermined time period after a change in temperature and/or carbon dioxide level due to, for example, the thermal capacity of the air in the plant growing system and the time taken for carbon dioxide to be added or removed from the plant growing system.

The method may further comprise controlling operation of at least a first light source of a first plant growing environment to have a period of operation at a minimum light intensity level and a second light source of a second plant growing environment to have a period of operation at a minimum light intensity level, operating the at least first and second light sources so that the period of operation of the first light source at a minimum light intensity level is offset from the period of operation of the second light source at a minimum light intensity level. The minimum light intensity level may be the light level required for the plants to process assimilates accumulated during photosynthesis or to induce flowering in the plants. In one embodiment, no light is output by the light source when it is operated at the minimum level.

With this method it is possible to distribute the required energy between multiple plant growing environments. Therefore, it is possible to minimise energy consumption by minimising the peak power requirements. Furthermore, it is possible to minimise the size and number of components required to operate two or more plant growing environments.

According to another aspect of the present invention, there is provided a method of controlling an artificial light plant growing system, comprising controlling operation of at least a first light source of a first plant growing environment to have a period of operation at a minimum light intensity level and a second light source of a second plant growing environment to have a period of operation at a minimum light intensity level, and operating the at least first and second light sources so that the period of operation of the first light source at a minimum light intensity level is offset from the period of operation of the second light source at a minimum light intensity level. The minimum light intensity level may be the light level required for the plants to process assimilates accumulated during photosynthesis or to induce flowering in the plants. In one embodiment, no light is output by the light source when it is operated at the minimum level.

With this method it is possible to distribute the required energy between multiple plant growing environments.

A barrier may be disposed between the at least first and second plant growing environments. Therefore, it is possible to restrict light leakage between the first and second plant growing environments. This means that the growth of a plant in each of the plant growing environments may be tightly controlled.

The first and second plant growing environments may be separate growth units or separate layers of a growth unit.

According to another aspect of the present invention, there is provided a computer program comprising instructions which, when executed by at least one processor, cause the or each of the methods described above to be performed.

According to another aspect of the present invention, there is provided a controller for controlling an artificial light plant growing system, the controller being configured to receive information indicative of a production demand for a plant type to be grown in the artificial light plant growing system and an energy supply for a light source of the artificial light plant growing system, and control operation of the light source of a plant growing environment of the artificial light plant growing system in dependence on the received information so that the production rate of a plant of said plant type grown in the system versus the production demand and energy supply is optimised.

Therefore, the growth rate of said plant can be decreased when the demand for the plants decreases, to reduce the likelihood that the plants mature when they are not required, alleviating waste.

In one embodiment, the controller comprises a processor, a memory, and a data connection, wherein the information indicative of one or more of a production demand for a plant type to be grown in the artificial light plant growing system and an energy supply for a light source of the artificial light plant growing system is retrieved by the processor using the data connection.

According to another aspect of the present invention, there is provided an artificial light plant growing system comprising a plant growing environment having a light source for supplying light to a plant being grown in the plant growing environment, and a controller for controlling an artificial light plant growing system, the controller being configured to receive information indicative of a production demand for a plant type to be grown in the artificial light plant growing system and an energy supply for a light source of the artificial light plant growing system, and control operation of the light source of a plant growing environment of the artificial light plant growing system in dependence on the received information so that the production rate of a plant of said plant type grown in the system versus the production demand and energy supply is optimised.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
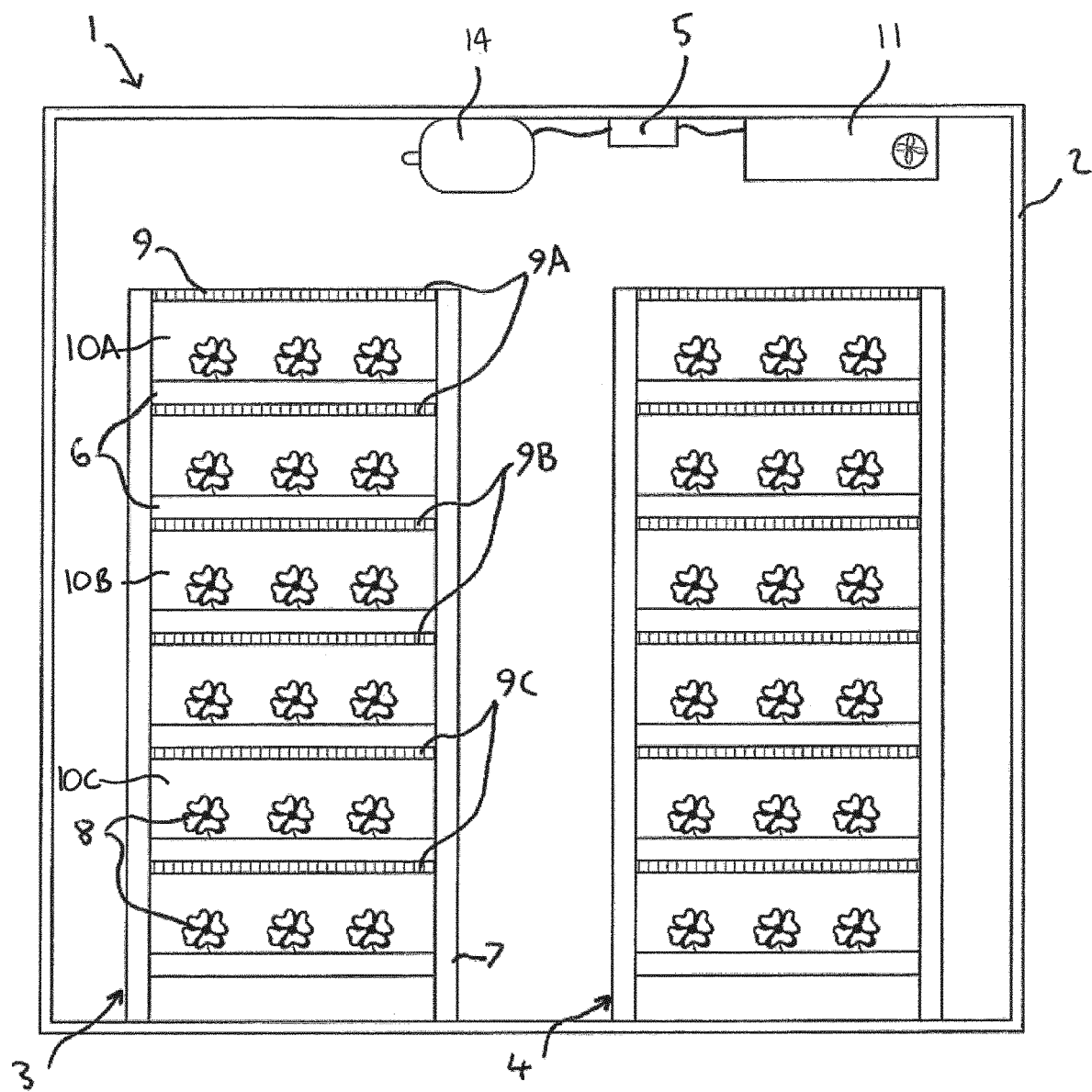
FIG. 1 is a schematic front view of a plant growing system according to an embodiment of the invention.
Figure 2:
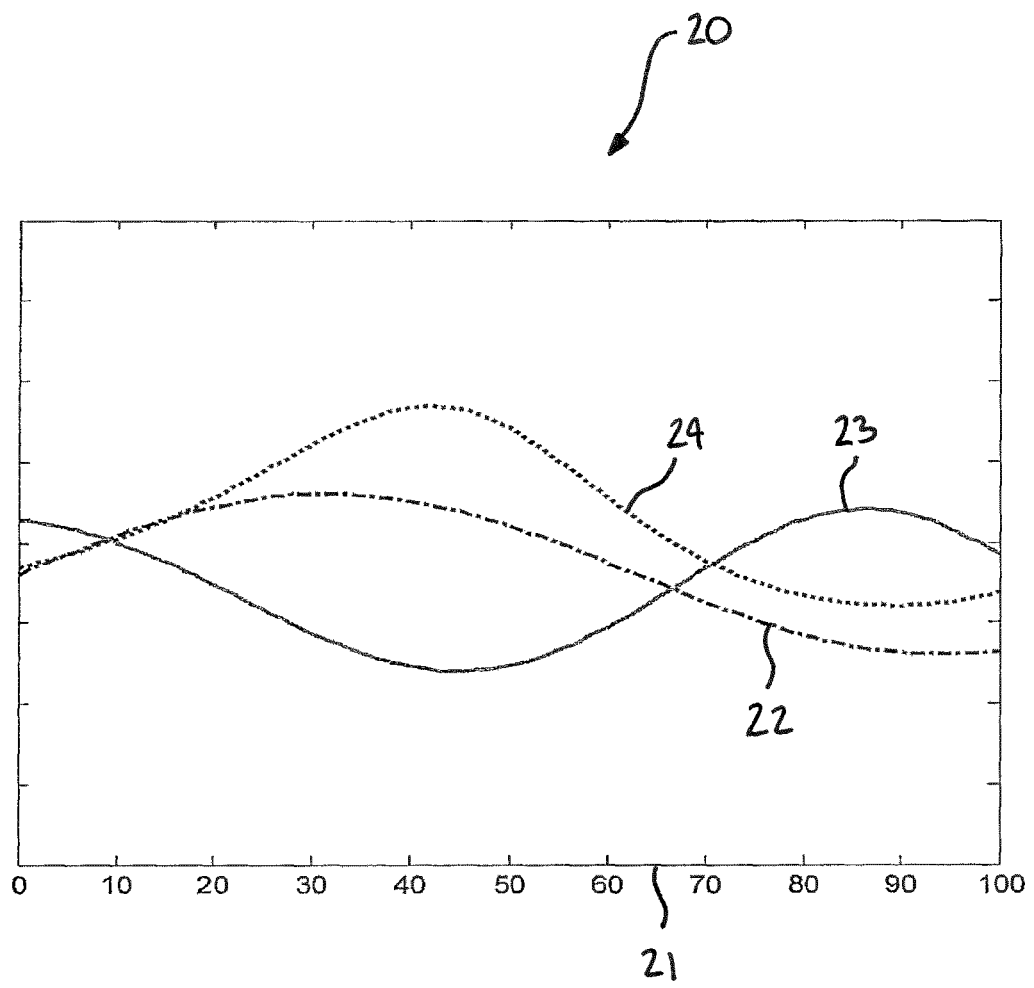
FIG. 2 is a graph showing the relationship between the light level, production demand and energy supply demand of the plant growing system of FIG. 1.

Referring now to FIGS. 1 to 4, an artificial light plant growing system 1 according to an embodiment of the invention is shown. The plant growing system 1 comprises an enclosure 2, first and second plant growth units 3, 4, and a controller 5.

The first and second growth units 3, 4 are disposed in the enclosure 2. The first and second growth units 3, 4 are identical in construction and therefore, for the sake of brevity, only the first growth unit 3 will be described in detail hereinafter. It will be understood that one of the growth units may be omitted, or further growth units may be included.

The first growth unit 3 comprises a plurality of horizontally disposed shelves 6. The shelves 6 are supported by a plurality of upstanding legs 7. Plants 8 are grown on each of the shelves 6 in accordance with, for example, the principles of hydroponic growth or aeroponic growth. It should be recognised that the term 'plant' may refer to fruit, vegetables, flowers, algae and or other biomass or biomaterial.

A light unit 9, acting as a light source, is disposed above each of the shelves 6 to provide light to the plants 8 growing on each of the shelves 6. The light unit 9 for providing light to the plants 8 on the uppermost shelf 6 is secured to an upper portion of the legs 7 of the first growth unit 3. Each of the remaining light units 9 are positioned above a corresponding shelf 6 by being secured to the underside of the shelf 6 above. However, alternative arrangements are envisaged. It will be understood that the light units 9 on the shelves 6 may together form a light source. That is, the light units 9 are operated together.

The enclosure 2 defines a plant growing environment 10. The enclosure 2 is, for example, a room or cupboard. The plant growing environment 10 in the present embodiment is a closed environment. The plant growing environment 10 is isolated from natural light. Therefore, growth of plants in the plant growing environment may be more accurately controlled. Plants grown in a plant growing environment 10 will generally be of the same plant type.

A climate control arrangement 11 is disposed to control the temperature in the plant growing environment 10. The climate control arrangement 11 is configured to control the temperature, T, in the plant growing environment 10. Relative humidity and ventilation in the plant growing environment 10 may also be controlled by the climate control arrangement 11. The climate control arrangement 11 has a temperature sensor 12 and a temperature controller 13.

A carbon dioxide ($CO_2$) level control arrangement 14 is disposed to control the carbon dioxide level in the plant growing environment 10. The carbon dioxide level control arrangement 14 comprises a carbon dioxide level sensor 15, a carbon dioxide supply (not shown) and a carbon dioxide level controller 16. The carbon dioxide level controller 16 adjusts the amount of carbon dioxide supplied to the plant growing environment 10 from the carbon dioxide supply according to the carbon dioxide level $CO_2$ measured by the carbon dioxide sensor 15. It will be understood that one or both of the climate control arrangement 11 and the carbon dioxide level control arrangement 14 may be omitted.

The temperature sensor 12 generates information indicative of the temperature in the plant growing environment 10. This information is provided to the controller 5. The carbon dioxide level sensor 15 generates information indicative of the carbon dioxide level in the plant growing environment 10. This information is provided to the controller 5. Therefore, the or both of the temperature T and carbon dioxide level $CO_2$ within the enclosure 2 can be monitored and/or controlled by the controller 5. The controller 5 is operable to operate the light units 9. The light units 9 communicate with the controller 5 such that the light output of each light unit 9 can be controlled by the controller 5. This may be achieved, for example, by adjusting the power supplied to each of the light units 9.

The controller 5 has a processor 17 and a memory 18. The controller 5 comprises, for example, a personal or laptop computer, a microcontroller or a field programmable gate array.

The processor 17 may take any suitable form. For instance, the processor 17 may be or include a microcontroller, plural microcontrollers, circuitry, a single processor, or plural processors. The controller 5 may be formed of one or multiple modules.

The memory 18 takes any suitable form. The memory 18 may include a non-volatile memory and/or RAM. The non-volatile memory may include read only memory (ROM), a hard disk drive (HDD) or a solid state drive (SSD). The memory stores, amongst other things, an operating system. The memory may be disposed remotely. The RAM is used by the processor 17 for the temporary storage of data. The operating system may contain code which, when executed by the controller 5, controls operation of each of the hardware components of the plant growing system 1. The controller 5 may be able to cause one or more objects, such as one or more profiles, to be stored remotely or locally by the memory 18. The controller 5 may be able to refer to one or more objects, such as one or more profiles, stored by the non-volatile memory and upload the one or more stored objects to the RAM.

The controller 5 is operable to operate the plant growing system 1 in response to an input, for example a user input.

The controller 5 is configured to control the plant production rate P of the plants 8 in the first and second growth units 3, 4. The production of biomass is approximately linearly proportional to the amount of light provided to the plants 8. Therefore, the plant production rate P can be controlled by the controller 5 by varying, for example, the power supplied to the light units 9, such that the intensity of the light output by the light units 9, acting as a light source, is varied.

Equation 1 shows the relationship between the plant production rate P (kg/m$^2$/h), the light use efficiency η (g/mol), the light level L (μmol/s/m$^2$), a constant $C_1$ and the minimum light level required for respiration, referred to hereinafter as the light offset $L_0$. The plant production rate P is also affected by the fraction of light I that is intercepted by the plants 8, which is dependent on leaf development, plant size and spacing between the plants 8.

$$P(t) = C_1 \eta(T, CO_2)(L(t) - L_0)I \quad \text{[Equation 1]}$$

The light level L supplied to the plants 8 is the photosynthetically active radiation (PAR) flux. The light use efficiency η represents the amount of dry biomass produced for one mole of photons in the PAR wavelength region and is dependent on the temperature T of the plants 8 and the carbon dioxide level $CO_2$. It is desirable to maximise the light use efficiency η of the plants 8 when there is a large light level L such that the plants 8 are able to effectively photosynthesise the light supplied thereto. The light use efficiency η can be increased by increasing the temperature T and carbon dioxide level $CO_2$ in the enclosure 2.

In the present embodiment, the controller 5 is configured to adjust the light level L offered to the plants 8 in dependence on information indicative of a production demand D of the plants 8. The controller 5 is also configured to adjust the light level L offered to the plants 8 in dependence on information indicative of energy supply C. The information of energy supply C may be based on a number of factors. Energy supply is generally provided by power stations which have a fixed energy output. Demand changes, and so energy availability, and therefore surplus, is variable. Therefore, by using energy when demand is low, energy wastage may be reduced. One measurable variable which corresponds to energy supply is based on a cost of energy factor $C_E$. The cost of energy is high when energy availability is low, that is energy demand is high such that additional power supply means may be needed to be used. Similarly, the cost of energy is low when energy availability is high, that is energy demand is low such that energy may be wasted. In embodiments, information indicative of either production demand D or energy supply C may be omitted. In the present embodiment, the controller 5 is programmed such that the light level L output by the light units 9 is a function of information indicative of the plant production demand D and energy supply C, based on the cost of energy $C_E$, as shown in Equation 2. The relationship between the light level L, the plant production demand D and the cost of energy $C_E$ of the present embodiment is shown graphically in FIG. 2. In graph 20 shown in FIG. 2, the x-axis 21 represents time. Dot-dash line 22 represents plant production demand, solid line 23 represents cost of energy, and broken line 24 indicates light level L. It should be recognised that other relationships between these variables are also intended to fall within the scope of the invention.

$$L(t) = f(D(t), C_E(t)) \quad \text{[Equation 2]}$$

Information indicative of the plant production demand D and the energy supply C are provided to the controller 5 via a communication module 19, for example, a wired or wireless connection. In one embodiment, the controller 5 uses the communication module 19 to retrieve the cost of energy factor $C_E$ from a power company website or from an internet database or software. In an alternative embodiment, the controller 5 uses the communication module 19 to retrieve information indicative of the energy supply C from a smart metering system.

The plant production demand D of the plants 8 is an indicator of the current production demand for the type of plant being grown by the plant growing system 1. This may be provided by, for example, information indicative of the volume of demand for a plant type, a market price for a plant type, and/or wastage volumes for a plant type. When the information indicative of plant production demand D for the plants 8 indicates an increased demand, the controller 5 increases the plant production rate P so that the plants 8 are ready for harvest sooner. Therefore, the plants 8 can be harvested when they are needed and wastage is minimised. When information indicative of plant production demand D indicates a decreased demand, the controller 5 decreases the plant production rate P so that the plants 8 do not mature for harvest when the demand for the type of plant is low. This prevents the plants 8 from maturing when they are not required, and so alleviates waste.

The controller 5 is also configured such that when the information indicative of energy supply C varies, the controller 5 varies the plant production rate P such that the plant growing system 1 controls energy usage efficiently. The controller 5 is programmed with Equation 3, which characterises the relationship between the light level L, light offset $L_0$, plant production demand D, cost of energy $C_E$ and a second constant $C_2$.

$$L(t) = L_0 + C_2 \frac{D(t)}{C_E(t)} \quad \text{[Equation 3]}$$

It can be seen from Equation 1 that the light use efficiency η, and thus the plant production rate P, is dependent on the temperature T and carbon dioxide level $CO_2$ in the enclosure 2. Therefore, to maximise the effect that the plant production demand D and cost of energy $C_E$ has on the plant production rate P, the controller 5 may be configured such that the temperature T and carbon dioxide level $CO_2$ are dependent on the light level L, which correlates to the plant production demand D and cost of energy $C_E$. In such an embodiment, the controller 5 is programmed with the relationship shown in Equation 4, which characterises the relationship between the temperature T, the light level L, a third constant $C_3$ and the minimum temperature required to sustain the plants 8, referred to hereinafter as the temperature offset $T_0$.

$$T(t) = T_0 + C_3 L(t) \quad \text{[Equation 4]}$$

The controller 5 is programmed with the relationship shown in Equation 5, which characterises the relationship between the carbon dioxide level $CO_2$, the light level L, a fourth constant $C_4$ and the minimum carbon dioxide level required to sustain the plants 8, referred to hereinafter as the carbon dioxide level offset $CO_{20}$.

$$CO_2(t) = CO_{20} + C_4 L(t) \quad \text{[Equation 5]}$$

Figure 3:
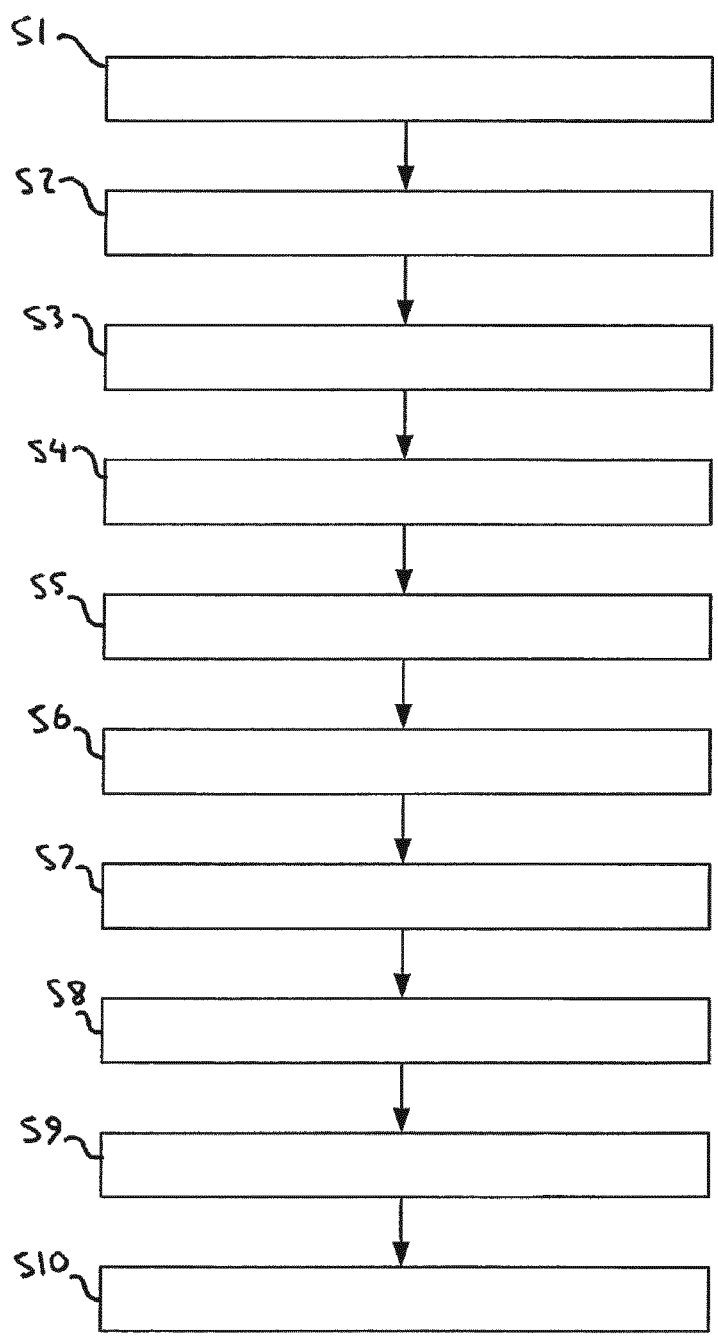
FIG. 3 is a flow chart of some of the steps performed by a processor of the plant growing system of FIG. 1.
Figure 4:
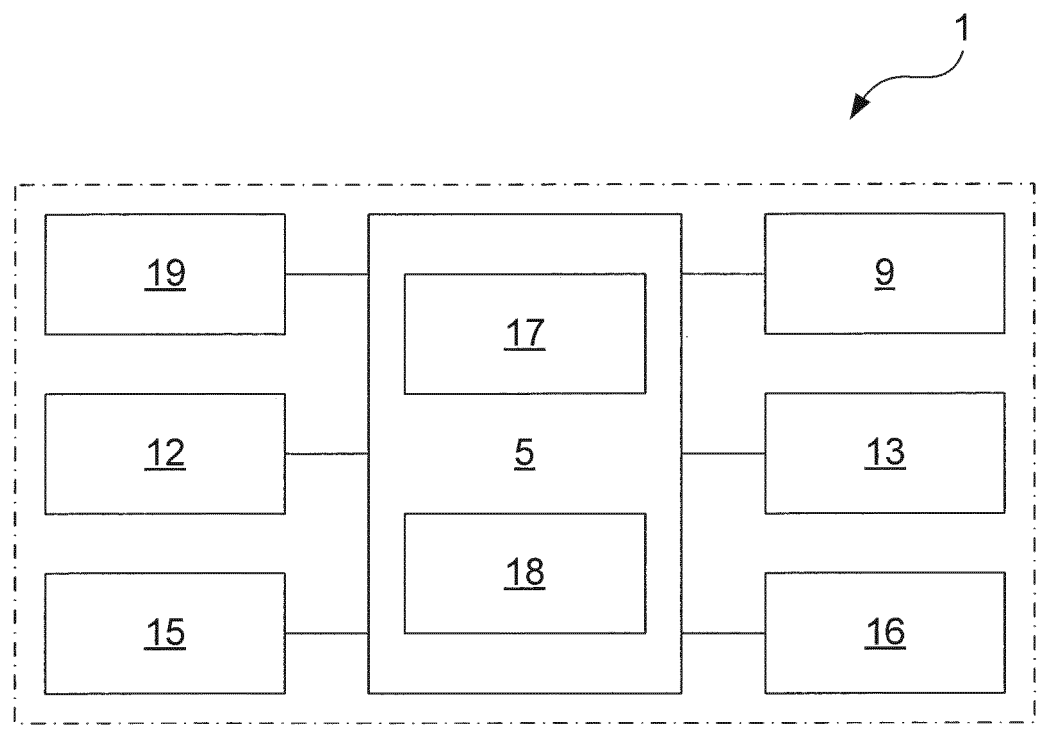
FIG. 4 is a schematic block circuit diagram of the plant growing system of FIG. 1.

FIG. 3 is a flow chart illustrating ten of the steps S1-S10 performed by the processor 17 of the controller 5. The first step S1 performed by the processor 17 is retrieving the information indicative of the plant production demand D and the cost of energy $C_E$. This is obtained via the communication module 19. The second step S2 performed by the processor 17 is retrieving the values of the light offset $L_O$ and second constant $C_2$ from the memory 18 of the controller 5. The third step S3 performed by the processor 17 is calculating the desired light level L to be supplied to the plants 8 using Equation 3 according to the values of the plant production demand D, cost of energy $C_E$, light offset $L_O$ and second constant $C_2$.

The fourth step S4 performed by the processor 17 is retrieving the values of the temperature offset $T_O$ and third constant $C_3$ from the memory 18 of the controller 5. The fifth step S5 performed by the processor 17 is calculating the desired temperature T in the enclosure 2 using Equation 4 according to the values of the third constant $C_3$, temperature offset $T_O$ and the desired light level L that was calculated by the processor 17 in the third step S3.

The sixth step S6 performed by the processor 17 is retrieving the values of the carbon dioxide level offset $CO_{2O}$ and fourth constant $C_4$ from the memory 18 of the controller 5. The seventh step S7 performed by the processor 17 is calculating the desired carbon dioxide level $CO_2$ in the enclosure 2 using Equation 5 according to the values of the fourth constant $C_4$, carbon dioxide level offset $CO_{2O}$ and the desired light level L that was calculated by the processor 17 in the third step S3.

The eighth step S8 performed by the processor 17 is controlling the climate control arrangement 11 and the carbon dioxide level control arrangement 14 to adjust the temperature T and carbon dioxide level $CO_2$ in the enclosure 2 in accordance with the desired temperature T and carbon dioxide level $CO_2$ calculated by the processor 17 in the fifth and seventh steps S5, S7. As discussed above, controlling the temperature T and carbon dioxide level $CO_2$ in the enclosure 2 allows for the light use efficiency η of the plants 8 to be adjusted.

The ninth step S9 performed by the processor 17 is to wait a predetermined time period. The tenth step S10 performed by the processor 17 is checking whether the desired light level L is equal to the current light level L output by the light units 9 and adjusting the light level L accordingly. The predetermined time period between the light level L being adjusted and the temperature T and carbon dioxide level $CO_2$ being adjusted is chosen to account for the response delay in the change in temperature T and carbon dioxide level $CO_2$ due to, for example, the thermal capacity of the air in the enclosure 2 and the time it takes for carbon dioxide gas released by the carbon dioxide level controller 2B to mix with the air in the enclosure 2. It has been found that the efficiency of the plant growing system 1 is improved when the light level controller 5 is configured to wait for the temperature T and carbon dioxide level $CO_2$ in the enclosure 2 to adjust to the desired value before altering the light level L supplied to the plants 8, since this allows for the light use efficiency η of the plants 8 to be adjusted before the new light level L is supplied thereto.

The processor 17 of the controller 5 cycles through and repeats each of the first to tenth steps S1-S10. It should be recognised that although in the above described embodiment the first to tenth steps S1-S10 are performed sequentially, in alternative embodiments (not shown) two or more of these steps may be performed concurrently. It will also be understood that in alternative embodiments, one or more of the steps may be omitted.

The controller 5 is configured to operate the light units 9 to provide the plants 8 with a 'light period', wherein the light units 9 are operated as described above to supply the plants 8 with light, and a 'dark period' wherein the lights units 9 are switched off or operated at a minimal light exposure level. The dark period is important for allowing the plants 8 to process the carbon assimilated by photosynthesis during the light period, by releasing oxygen into the air and transporting carbohydrates, and for inducing the plants 8 to initiate the flowering process.

In the present embodiment, the light units 9 of the plant growing system 1 are split into first, second and third lighting groups 9A, 9B, 9C. The controller 5 operates all of the light units 9 in each lighting group 9A, 9B, 9C simultaneously. However, it will be understood that the controller 5 may operate each of the lighting groups 9A, 9B, 9C independently. The first, second and third lighting groups 9A, 9B, 9C each provide light to different plants 8 in the plant growing system 1.

In the present arrangement, the controller is configured to refer to a reference profile stored by the controller to operate the system 1 so that the dark period of each of the first, second and third lighting groups 9A, 9B, 9C is 8 hours and the light period is 16 hours. Therefore, in a 24 hour period, the controller 5 cycles each of the first, second and third lighting groups 9A, 9B, 9C through an entire light period and an entire dark period.

The controller 5 is configured such that the dark period of the first, second and third lighting groups 9A, 9B, 9B are staggered over a 24 hour period such that no more than two of the first, second and third lighting groups 9A, 9B, 9C are operated simultaneously to provide a light period to the corresponding plants 8. For example, during a 24 hour period starting at 12 AM, the first lighting group 9A is powered between 12 AM and 4 PM to provide a light period to a portion of the plants 8 and is then switched off between 4 PM and 12 AM to provide a dark period. Meanwhile, the second lighting group 9B is powered between 8 AM and 12 AM to provide a light period to a portion of the plants 8 and is switched off between 12 AM and 8 AM to provide a dark period. Furthermore, the third lighting group 9C is powered between 4 PM and 8 AM to provide a light period to a portion of the plants 8 and is switched off between 8 AM and 4 PM to provide a dark period. A barrier (not shown), such as screens or curtains, are provided to isolate each of the first, second and third lighting groups 9A, 9B, 9C from each other. The lighting groups 9A, 9B, 9C are isolated from each other to alleviate the leakage of light to the portion of the plants 8 that are provided with a dark period. The duration of the light period relative to the dark period may be adjusted in accordance with the information indicative of the plant production demand D and/or the energy supply C. For example, in one such embodiment if the production demand D decreases, then the dark period of the plants for each of the first, second and third lighting groups 9A, 9B, 9C is increased, and thus the light period decreased, to decrease the production rate P.

In the above described embodiment, the plants 8 supplied with light by each of the first, second and third lighting groups 9A, 9B, 9C are optically isolated from each other to define independent plant growing environments 10A, 10B, 10C. For example, the plants 8 may be provided in separate housings or by individually sealing each shelf 6, such that the temperature T and carbon dioxide level $CO_2$ thereof can be independently controlled. The controller 5 is configured to increase the light use efficiency η of the plants 8 being provided with a light period by increasing the temperature T and carbon dioxide level $CO_2$ thereof. Similarly, the controller 5 is configured to decrease the light use efficiency η of the plants 8 being provided with a dark period by decreasing the temperature T and carbon dioxide level $CO_2$ thereof. This further reduces the total installed energy capacity of the plant growing system 1.

Since the light and dark periods of the light units 9 are distributed such that no more than two of the first, second and third lighting groups 9A, 9B, 9C are operated to provide a light period at any one time, the power consumption of all of the combined light units 9 in the plant growth system 1 will not exceed two thirds of the maximum power rating of the light units 9. Therefore, the maximum power capacity of the plant growing system 1 is reduced. It is possible to distribute the required energy between multiple plant growing environments. Therefore, it is possible to minimise energy consumption by minimising the peak power requirements. Furthermore, it is possible to minimise the size and number of components required to operate two or more plant growing environments.

Although in the above described embodiment the light period of the first, second and third lighting groups 9A, 9B, 9C is 16 hours and the dark period is 8 hours, it should be recognised that other durations of light and dark periods are intended to fall within the scope of the invention and, furthermore, it should be recognised that the total light and dark period of the first, second and third lighting groups 9A, 9B, 9C does not have to be 24 hours in duration. In one embodiment (not shown), the controller is configured to vary the light and dark period durations in accordance with the type of plant being grown and/or information indicative of the age of the plant. It has been found that in some cases the optimum light period and dark period duration to promote growth varies according to the age of the plants and/or the type of plant. Therefore, by varying the durations of the light and dark periods in accordance with the type of plant and/or information indicative of the age of the plants, the efficiency and/or production rate of the plant growing process is increased.

Although in the above described embodiment the light units 9 are split into first, second and third lighting groups 9A, 9B, 9C, in alternative embodiments (not shown) the light units may be split into greater or fewer than three lighting groups. In one such embodiment (not shown), the light units are split into two lighting groups and the controller is configured such that only one of the lighting groups is operated to provide a light period at any one time.

Although in the above described embodiment the controller 5 is programmed with Equations 3, 4 and 5 to control the light level L, temperature T and carbon dioxide level $CO_2$ according to the market demand D, cost of energy $C_E$, light offset $L_0$, temperature offset $T_0$, carbon dioxide level offset $CO_{20}$ and the second, third and fourth constants $C_2$, $C_3$, and $C_4$, in alternate embodiments (not shown) the controller 5 is programmed with different Equations that characterise the relationship between these, or some of these, variables.

Although in the above described embodiment the controller 5 is configured to adjust the light level L supplied to the plants 8 according to the plant production demand D and the cost of energy $C_E$, in an alternate embodiment (not shown) the controller is configured such that the light level L is not adjusted according to the cost of energy $C_E$.

Although in the above described embodiment the controller 5 is configured to adjust the temperature T and carbon dioxide level $CO_2$ in the enclosure 2 according to the desired light level L, in alternate embodiments (not shown) the controller 5 does not adjust the temperature T and/or the carbon dioxide level $CO_2$.

Although in the above described embodiment the controller 5 is configured to adjust the light level L supplied to the plants 8 according to the plant production demand D and the cost of energy $C_E$ and additionally is configured to offset the light periods of the first, second and third lighting groups 9A, 9B, 9C, in alternate embodiments the controller 5 is configured to perform only one of these two operations.

In the above described embodiment the controller 5 is configured such that the light level L of the light units 9 is adjusted to control the plant production rate P of the plants 8. In alternative embodiments, the plant production rate P of the plants 8 is instead, or additionally, varied by adjusting the light spectrum profile output by the light units 9. For example, if the plants 8 in the plant growing system 1 are abundant in the chlorophyll a pigment, which does not readily absorb the green component of the visible light spectrum, then the plant production rate P can be decreased by increasing the proportion of the green component of the light that is emitted from the light units 9. Conversely, the plant production rate P can be increased by decreasing the proportion of the green component of the light that is emitted form the light units 9. In another embodiment, the controller 5 is configured such that the light spectrum profile output by the light units 9 is varied according to the light level L output by the light units 9. It has been found that for certain types of plants the optimum light spectrum profile to promote growth varies according to the light level L that the plants are subjected to. For instance, some types of plants will more efficiently use light from one portion of the light spectrum when the light level L is low and more efficiently use light from another portion of the light spectrum when the light level L is high. Therefore, by varying the light spectrum profile of the light output by the light units 9 in accordance with the light level L, the efficiency and/or production rate P of the plant growing process is increased. In another embodiment, the light spectrum profile of the light output by the light units 9 is adjusted according to information indicative of the age of the plants, for example, the date that the plants were planted or the total amount of light that the plants have received. It has been found that for certain varieties of plants the optimum light spectrum profile to promote growth varies according to the age of the plants. For example, for certain types of plants, plants that have recently been planted grow more efficiently if they are exposed to a light spectrum profile with a large blue light fraction whereas plants that are reaching maturity require a lower blue light fraction. Therefore, by varying the light spectrum profile of the light output by the light units 9 in accordance with information indicative of the age of the plants, the efficiency and/or production rate P of the plant growing process is increased. In yet another embodiment, the light spectrum profile output by each of the light units 9 is adjusted according to the type of plant that is being supplied with light by each light unit 9. This allows for the light spectrum profile to be tailored to the light requirements of the type of plant currently being grown, since certain types of plants more efficiently use light from certain portions of the light spectrum. In one such embodiment, the type of plant is input into the controller 5 by the user.

In one such embodiment, the plant growing system 1 comprises a light sensor (not shown) for detecting the light spectrum profile of the light emitted from the light units 9. This allows for the light spectrum profile of the light in the enclosure 2 to be measured, even if the light units 9 are used in conjunction with an additional light source having an unknown or varied light spectrum profile.

It will be appreciated that the term "comprising" does not exclude other elements or steps and that the indefinite article "a" or "an" does not exclude a plurality. A single processor may fulfill the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A method of controlling an artificial light plant growing system wherein the artificial light plant growing system is isolated from natural light, the method comprising:
receiving information indicative of a production demand (D) for a plant type to be grown in the artificial light plant growing system and information indicative of an energy supply (C) for a light source of the artificial light plant growing system,
receiving information indicative of a light offset ($L_0$), a constant ($C_2$), and information indicative of a cost of energy ($C_E$),
controlling operation of the light source of a plant growing environment of the artificial light plant growing system in dependence on the received information so that the production rate (P) of the plant of said plant type grown in the system versus the production demand (D) and energy supply (C) is optimised, the optimization comprising controlling energy usage such that a light level at a time t, L(t), is calculated using the equation:

$$L(t)=L_0+C_2*[D(t)/C_E(t)]$$

and,
controlling the level of $CO_2$ in the plant growing environment of the artificial light plant growing system in dependence on the determined operation of the light source.

2. The method according to claim 1, further comprising referring to one or more plant type specific parameters in dependence on the plant type to be grown, and controlling operation of the light source in dependence on the one or more plant type specific parameters.

3. The method according to claim 2, wherein the one or more plant type specific parameters is a minimum light exposure level to be supplied to a plant of said plant type.

4. The method according to claim 2, wherein the one or more plant type specific parameters is a maximum light exposure level to be supplied to a plant of said plant type.

5. The method according to claim 2, wherein the one or more plant specific parameters is a minimum period of operation of the light source at a minimum level.

6. The method according to claim 2, wherein the one or more plant specific parameters is an intensity level of the light source.

7. The method according to claim 1, further comprising controlling the temperature in the plant growing environment of the artificial light plant growing system in dependence on the determined operation of the light source.

8. The method according to claim 1, further comprising detecting an environmental condition of the plant growing environment and controlling operation of the light source in dependence on the detected environmental condition.

9. The method according to claim 8, further comprising adjusting operation of the light source when a desired environmental condition in the plant growing environment is detected.

10. A computer program comprising instructions which, when executed by at least one processor, cause the method of claim 1 to be performed.

11. A controller for controlling an artificial light plant growing system isolated from natural light, the controller being configured to:
receive information indicative of a production demand (D) for a plant type to be grown in the artificial light plant growing system and an energy supply for a light source of the artificial light plant growing system,
retrieve information indicative of a light offset ($L_0$), a constant ($C_2$), and information indicative of a cost of energy ($C_E$),
control operation of the light source of a plant growing environment of the artificial light plant growing system in dependence on the received information so that the production rate (P) of a plant of said plant type grown in the system versus the production demand (D) and energy supply (C) is optimised, the optimization comprising controlling energy usage such that a light level at a time t, L(t), is calculated using the equation:

$$L(t)=L_0+C_2*[D(t)/C_E(t)]$$

and
control the level of $CO_2$ in the plant growing environment of the artificial light plant growing system in dependence on the determined operation of the light source.

12. An artificial light plant growing system isolated from natural light, comprising
a plant growing environment having a light source for supplying light to a plant being grown in the plant growing environment, and
a controller according to claim 11.

13. The method according to claim 1, further comprising:
controlling operation of at least a first light source of a first plant growing environment to have a first period of operation at a first minimum light intensity level and a second light source of a second plant growing environment to have a second period of operation at a second minimum light intensity level, and
operating the at least first and second light sources so that the first period of operation of the first light source at the first minimum light intensity level is offset from the second period of operation of the second light source at the second minimum light intensity level.

* * * * *